United States Patent [19]

Fujita

[11] Patent Number: 4,802,721
[45] Date of Patent: Feb. 7, 1989

[54] SCANNING OPTICAL SYSTEM
[75] Inventor: Hisao Fujita, Hino, Japan
[73] Assignee: Konishiroku Photo Industry Co., Ltd., Tokyo, Japan
[21] Appl. No.: 97,297
[22] Filed: Sep. 14, 1987

Related U.S. Application Data

[63] Continuation of Ser. No. 784,366, Oct. 4, 1985, abandoned.

[30] Foreign Application Priority Data

Oct. 5, 1984 [JP] Japan ................. 59-208345

[51] Int. Cl.$^4$ ................. G02B 26/10; G02B 13/18
[52] U.S. Cl. ................. 350/6.8; 350/432
[58] Field of Search ............ 350/432, 6.8, 433, 469, 350/443, 475; 358/199, 293, 342

[56] References Cited

U.S. PATENT DOCUMENTS 4,253,724  3/1981  Minoura et al. ................. 350/6.8
4,379,612  4/1983  Matsuoka et al. ................. 350/6.8
4,523,801  7/1985  Baba et al. ................. 350/6.8
4,571,035  2/1986  Sakuma ................. 350/6.8

Primary Examiner—John K. Corbin
Assistant Examiner—Ronald M. Kachmarik
Attorney, Agent, or Firm—Jordan B. Bierman

[57] ABSTRACT

In a scanning optical system for deflecting a laser beam by a deflector to converge it on a scanning surface by a focusing lens, it is difficult to compensate for both an image surface curvature and a distortion aberration in the optical system. An optical system according to the present invention is designed to minimize a curvature of a meridional image surface of a focusing lens, and a sagittal image surface and distortion are compensated for by arranging an aspherical surface between the focusing lens and the scanning surface. This aspherical surface is advantageously arranged by forming a cylindrical lens, which is inserted to compensate for a tilting of the deflected surface, into an aspherical surface.

5 Claims, 1 Drawing Sheet

FIG. 1(a)
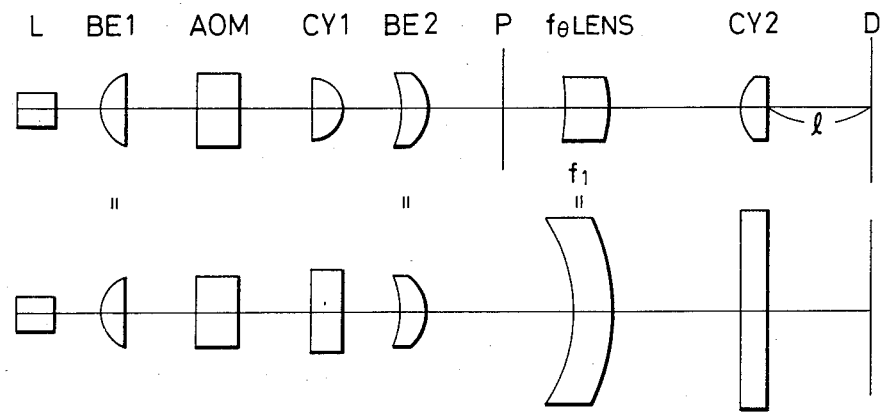
FIG. 1(b)
FIG. 2
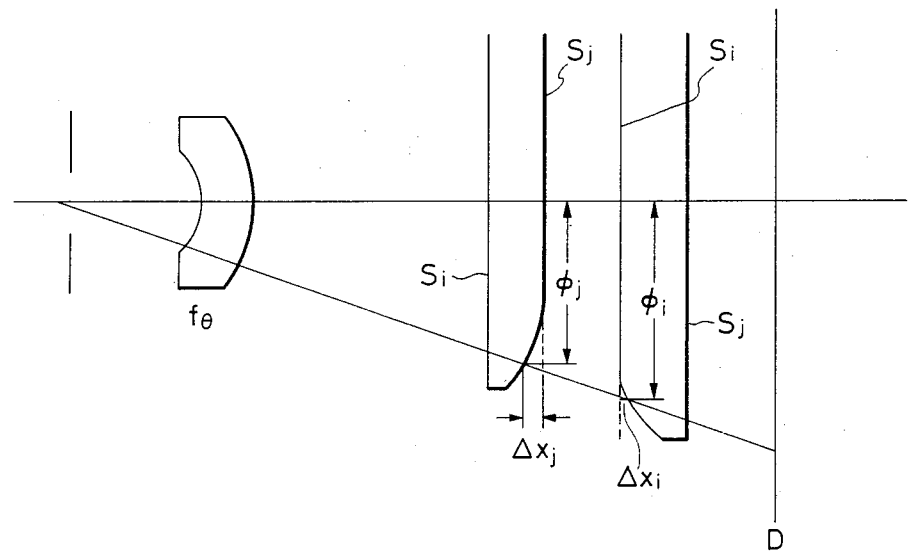

SCANNING OPTICAL SYSTEM

This application is a continuation of application Ser. No. 784,366 filed Oct. 4, 1985 now abandoned.

BACKGROUND OF THE INVENTION

1. Field of the Invention

This invention relates to scanning optical systems, and particularly to a scanning optical system with less distortion (aberration).

2. Description of the Prior Art

A scanning optical system is well known in which in a laser printer or the like, a laser beam is deflected by a rotary polyhedral mirror or the like and focusing and scanning are effected on a scanning surface by an f$\theta$ lens. For example, Japanese Patent Application Laid-Open Nos. 5706/83 and 93021/83 disclose a simple scanning optical system which uses a single f$\theta$ lens. This scanning optical system has no problem when it is used for releasing characters but poses a problem of distortion due to distortion aberration when the system is used for releasing drawings. If this distortion is compensated for, the curvature of an image surface has to be sacrificed, as described in detail in the aforesaid applications.

SUMMARY OF THE INVENTION

An object of the present invention is to provide a scanning optical system in which a deviation from the f$\theta$ characteristic resulting from a lens constructed by rotary symmetrical surfaces of an optical axis is effectively compensated for without making the structure of an optical system complicated, and the curvature of an image surface is also excellent and scanning without distortion can be performed on the scanning surface.

The system will now be described in detail with reference to the drawings.

FIGS. 1a and 1b show an optical arrangement of a scanning optical system. FIG. 1(a) is a sectional view of a surface vertical to a scanning line, and FIG. 1(b) is a sectional view of a surface including the scanning line.

A beam emitted from a laser L enters a light deflector such as a polygon P through lenses BE1 and BE2 having a positive power which serves as a beam expander. Between the lenses BE1 and BE2 are arranged an AOM element to control ON and OFF of the light, and a cylindrical lens CY1 to converge the beam on the polygon P within FIG. 1(a). This cylindrical lens CY1 may be arranged at that position to thereby reduce a spacing between the lens BE2 and the light deflector such as the polygon P.

The light whose light path is bended by the light deflector is incident at a certain angle on an focusing element f$\theta$ constructed by rotary symmetrical surfaces of an optical axis and passes through a cylindrical lens CY2 to form a spot on a photosensitive drum D.

The cylindrical lens CY2 arranged at the rear of the f$\theta$ lens has the refractive power which establishes substantially the focusing relation between the polygon surface and the drum surface in cooperation with the f$\theta$ lens within the section of FIG. 1(a). This has an object of compensating for an angle of inclination of the polygon as well known.

The light from the surface of the polygon P is incident upon the cylindrical lens CY2 via the f$\theta$ lens. Assuming that $\Delta S$ represents the curvature aberration amount of a sagittal image surface generated at the f$\theta$ lens and M represents the lateral focusing magnification of the cylindrical lens CY2, the curvature aberration amount $\Delta S$ of the sagittal image surface on the drum is approximately expressed by the following:

$$\Delta S = M^2 \Delta S + \Delta S \theta$$

where $\Delta S \theta$ is the amount exclusively dependent upon the angle incident on the cylindrical lens CY2. As the incident angle increases, the $\Delta S \theta$ also increases.

The first term of the right side in the above-described equation may be made small by making $M^2$ small. This means that the cylindrical lens CY2 is made closer toward the drum surface D. However, in the case where an electro-copying type method is used as an image forming method, for example, it is necessary to take into consideration contamination prevention of the cylindrical lens CY2 caused by powder or the like, which is a factor other than the optical design. The second term of the right side may be made small by forming a spacing between the polygon P and the f$\theta$ lens to use the f$\theta$ lens in the form of a telecentricity. However, there arises a disadvantage that the f$\theta$ lens increases in size.

In consideration of the foregoing, the spacings between the polygon, the f$\theta$ lens, the cylindrical lens CY2 and the photosensitive surface D are determined.

Even if the cylindrical lens CY2 includes a toroidal surface, the image surface curvature of a meridional surface is not so much affected as a sagittal surface. Accordingly, the meridional surface is basically controlled by the f$\theta$ lens but even if the sagittal surface should be deteriorated than the meridional surface in case of the individual f$\theta$ lens, it can be compensated for by a combination of that surface with the cylindrical lens CY2.

In the laser beam scanning optical system, the spherical aberration and comatic aberration generally involves no problem since the F number is dark, over 50.

In view of the optical performance, only the distortion remains. It is known that where the f$\theta$ lens is in the form of a single lens, it is difficult to minimize both the meridional surface and distortion.

According to the present invention, the f$\theta$ lens is designed so that the curvature of the meridional image surface is minimal, and the distortion remained at that time is compensated for by forming at least one surface of the cylindrical lens CY2 into an aspherical surface. Desirably, this aspherical surface is formed not by a cylindrical surface or a toroidal surface but by forming rotary symmetrical surfaces of an optical axis into an aspherical surface, from a viewpoint of processing method.

In addition, it is desired that the aspherical surface is satisfied with $$0.05 < 1/f\theta < 0.5$$

where f$\theta$ is the focal length of the f$\theta$ lens, and l is the distance from the aspherical lens to the scanning surface.

The lower limit is provided because of the fact that if a deviation of the aspherical surface from a spherical surface excessively increases for compensating for the distortion, working becomes difficult, thus affecting also on the image surface curvature. The upper limit indicates the limit at which the aforesaid $M^2$ acts to minimize the sagittal image surface curvature and also indicates the limit at which an error in working of the aspherical surface is not so severely required.

It is noted that the aforementioned aspherical surface is not limited to a one surface but even includes not only the case where both surfaces of the cylindrical lens CY2 are aspherical surfaces but the case where a plurality of CY2 are provided and an aspherical lens is inserted separately from the cylindrical lens CY2, an example of which is shown in FIG. 2.

In terms of the characteristic, the fθ lens often has a positive distortion. In order to compensate for such distortion and compensate for a high order distortion from positive to negative in a wide angle of view, the aspherical shape is desirably satisfied with the following condition.

$$\Sigma \Delta Xi(\phi i) - \Sigma \Delta Xj(\phi j) > 0$$

where $\Delta Xi$: displacement of an aspherical surface of a surface $S_i$ on the object side $\Delta Xj$: displacement of an aspherical surface of a surface $S_j$ on the image side $\phi i, \phi j$: height from an optical axis at a point where the light at the maximum angle of view intersects the aspherical surface

BRIEF DESCRIPTION OF THE DRAWINGS

FIGS. 1a and 1b is a view of an optical arrangement in a first embodiment of a scanning optical system in accordance with the present invention, and FIG. 2 is a partial view of an optical arrangement in another embodiment thereof.

DETAILED DESCRIPTION OF THE PREFERRED EMBODIMENT

In the following, the effects of the present invention are specifically shown by way of the embodiments.

| Embodiment 1 | | | |
|---|---|---|---|
| | R | D $d_o = 40.0$ | |
| 1 | 72.0 | 5.0 | n = 1.51462 |
| 2 | ∞ | 254.6 | |
| 3 | ∞ | 5.0 | n = 1.51462 |
| *4 | −60.0 | 302.0 | |
| 5 | ∞ | 5.0 | n = 1.51462 |
| 6 | −218.0 | 110.0 | |

} Beam shaping system

| -continued | | | |
|---|---|---|---|
| Embodiment 1 | | | |
| | R | D $d_o = 40.0$ | |
| 7 | ∞ (polygon surface) | 70.0 | |
| 8 | −290.4071 | 8.5 | n = 1.74967 |
| 9 | −122.5165 | 217.0 | |
| *10 | 26.5 | 5.0 | n = 1.52065 |
| 11 | ∞ | 53 mm | |

*Mark indicates the cylindrical surface.

Diameter of a beam emitted from a laser tube: 0.7 mm $\lambda = 6328$ Å

The 11th surface is formed into aspherical surface as follows:

$$Z = \frac{C\phi^2}{1 + \sqrt{1 - (HK)C^2\phi^2}} + \Sigma_i A_{pi}\phi^{pi}$$

and an aspherical shape are indicated.

Coefficient of aspherical surface

| |
|---|
| $A_4 = -0.48 \times 10^{-7}$ |
| $A_6 = +0.66 \times 10^{-11}$ |
| $A_8 = -0.584 \times 10^{-15}$ |
| $A_{10} = 0.398 \times 10^{-20}$ |
| $A_{12} = 0.113 \times 10^{-23}$ |
| $K = 0$ |

Focal length of the fθ lens by the 8th and 9th surfaces: $f_1 = 276.68$ mm

| Rotary Angle of Polygon and Drum Spot Position | | | | | | | |
|---|---|---|---|---|---|---|---|
| Incident angle by polygon rotation $\theta \sin\theta$ | 0.0 mm | 0.108 | 0.18 | 0.252 | 0.324 | 0.360 | 0.390 |
| Ideal spot position of drum surface f = 271.478 | 0.0 mm | 29.377 | 49.134 | 69.158 | 89.576 | 99.977 | 108.76 |
| Ideal spot position of drum surface f = 271.478 with aspherical surface | 0.0 mm | 29.377 | 49.108 | 69.180 | 89.645 | 99.979 | 108.78 |
| Ideal spot position of drum surface f = 271.478 without aspherical surface | 0.0 mm | 29.453 | 49.398 | 69.825 | 90.967 | 101.89 | 111.21 |

| Embodiment 2 | | | |
|---|---|---|---|
| | R | D $d_o = 40.0$ | |
| 1 | 72.0 | 5.0 | n = 1.51462 |
| 2 | ∞ | 254.6 | |
| 3 | ∞ | 5.0 | n = 1.51462 |
| *4 | −60.0 | 302.0 | |
| 5 | ∞ | 5.0 | n = 1.51462 |
| 6 | −218.0 | 110.0 | |
| 7 | ∞ (polygon surface) | 70.0 | |
| 8 | −380.0 | 6.0 | n = 1.49012 |
| 9 | −100.46 | 217.0 | |

} Beam shaping system

-continued

| | | Embodiment 2 | |
|---|---|---|---|
| | R | D $d_o = 40.0$ | |
| *10 | 25.2 | 5.0 | n = 1.49012 |
| 11 | ∞ | 53.0 | |

Coefficient of an aspherical surface of the 9th surface:

$K = -0.11$

Coefficient of an aspherical surface of the 11th surface:

| $A_4 = -0.48 \times 10^{-7}$ | $P_4 = 4.0$ |
|---|---|
| $A_6 = 0.66 \times 10^{-11}$ | $P_6 = 6.0$ |
| $A_8 = -0.70 \times 10^{-15}$ | $P_8 = 8.0$ |
| $A_{10} = 0.65 \times 10^{-20}$ | $P_{10} = 10.0$ |
| $A_{12} = 0.165 \times 10^{-23}$ | $P_{12} = 12.0$ |

| | | | | | | | |
|---|---|---|---|---|---|---|---|
| Incidence $\sin \theta$ | 0.0 | 0.108 | 0.180 | 0.254 | 0.324 | 0.360 | 0.39 |
| Spot position of drum surface | 0.0 mm | 29.544 mm | 49.407 | 69.60 | 90.079 | 100.43 | 109.44 |
| Ideal position | 0.0 | 29.544 | 49.413 | 69.55 | 90.080 | 100.55 | 103.38 |
| Differential | 0.0 | 0.0 | −0.006 | +0.05 | −0.001 | −0.12 | +0.06 |

With the above-described configuration, in the present invention, it is possible to compensate for the distortion by a very simple construction without special compensating members. Due to the falling compensation, in the optical system in which the cylindrical lens CY2 is inserted, the distortion sometimes occurs due to the CY2 itself. On the other hand, in the present invention, the compensation becomes possible by introducing an aspherical surface into one surface.

While in the above-described embodiment, the focusing lens is employed which has the $f\theta$ characteristic, it will be noted that the distortion caused by the lens having the $\sin \theta$ characteristic may be compensated for in exactly the same manner.

Furthermore, a description has been made of the embodiment in which a single lens is used as the $f\theta$ lens. It is known however that if a plurality of lens systems are used to form a wide angle of view, the distortion changes as the angle of view increases from positive to negative due to the high-order aberration. However, it is possible to compensate for the high-order distortion as described by selecting a suitable aspherical shape.

While the optical system including a cylindrical lens has been described as an embodiment, it will be noted that the present invention may be embodied into an optical system having no cylindrical lens and a toroidal lens.

What is claimed is:

1. A scanning optical system comprising a laser as a light source, a deflector for deflecting and scanning the emitted light of said laser, and a focusing element for converging the emitted light of said deflector on the scanning surface, characterized in that at least one optical element having an aspherical, non-planar, contour in section in a scanning direction is arranged at the rear of said focusing element.

2. A scanning optical system as claimed in claim 1, which is satisfied with the following condition:

$$0.05 < l/f\theta < 0.5$$

where $f\theta$ is the focal length of a focusing element, and $l$ is the distance from an aspherical lens and a scanning surface.

3. A scanning optical system as claimed in claim 1, which is satisfied with:

$$\Sigma \Delta X_i(\phi_i) - \Sigma \Delta X_j(\phi_j) > 0$$

where $\Delta X_i$: displacement of an aspherical surface of a surface $S_i$ on the object side $\Delta X_j$: displacement of an aspherical surface of a surface $S_j$ on the image side $\phi_i, \phi_j$: height from an optical axis at a point where the light at the maximum angle of view intersects the aspherical surface and, $$Z = \frac{C\phi^2}{1 + \sqrt{1 - (HK)C^2\phi^2}} + \Sigma_i A_{pi}\phi^{pi}$$

4. A scanning optical system as claimed in claim 1 wherein an optical element having said aspherical surface cooperates with said focusing element to have a refracting power so that a reflecting surface and a surface being scanned of said deflecting device establish an approximately focused relation with each other.

5. The scanning optical system of claim 4 wherein the optical element having said aspherical surface is a cylindrical lense.

* * * * *